C. E. AKELEY.
FILM GUIDE FOR MOTION PICTURE CAMERAS.
APPLICATION FILED OCT. 12, 1916.
1,297,532.
Patented Mar. 18, 1919.
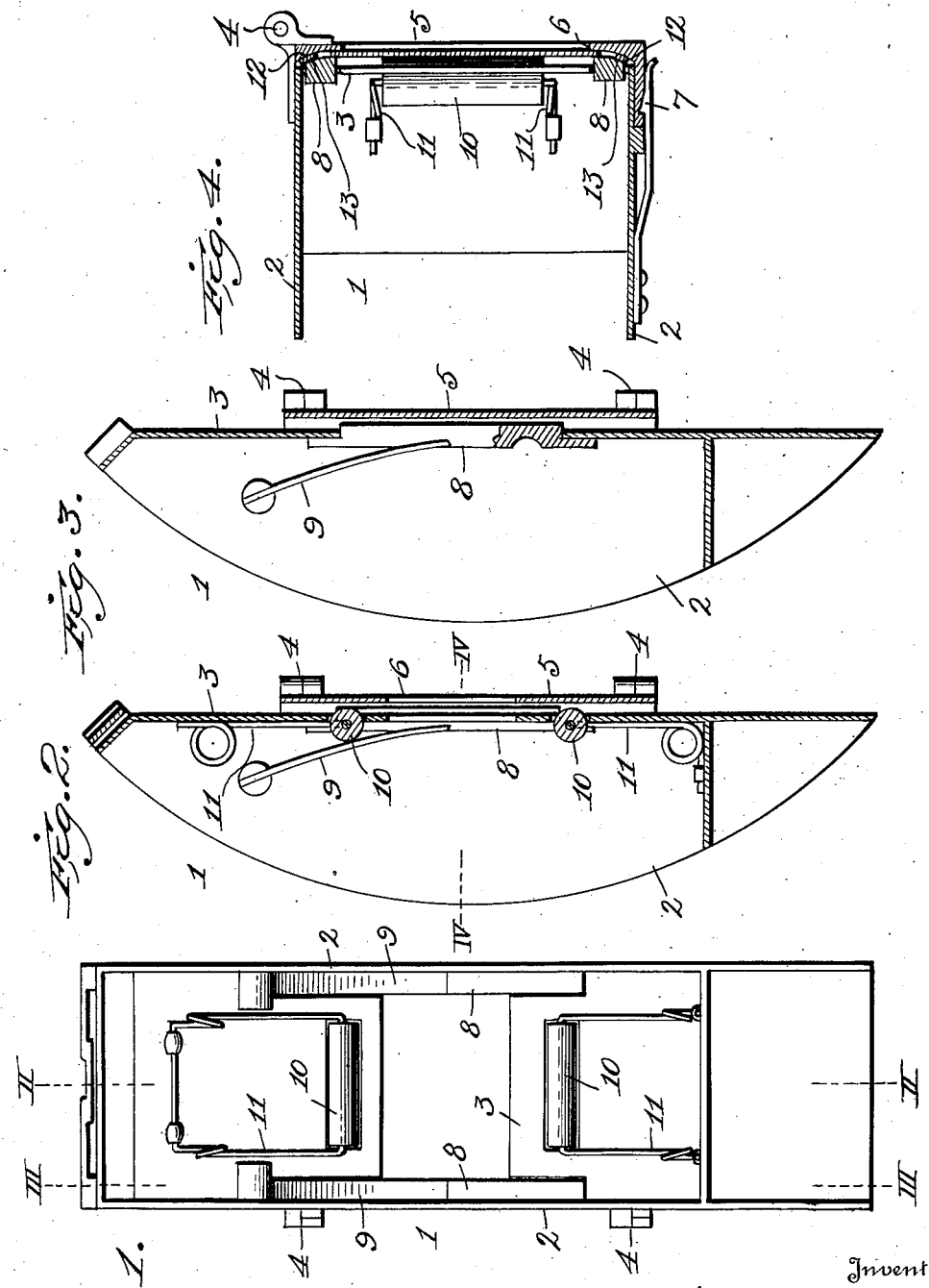

UNITED STATES PATENT OFFICE.

CARL E. AKELEY, OF NEW YORK, N. Y., ASSIGNOR TO AKELEY CAMERA, INC., OF NEW YORK, N. Y., A CORPORATION OF NEW YORK.

FILM-GUIDE FOR MOTION-PICTURE CAMERAS.

1,297,532.  Specification of Letters Patent.  Patented Mar. 18, 1919.

Original application filed April 27, 1916, Serial No. 93,929. Divided and this application filed October 12, 1916. Serial No. 125,195.

*To all whom it may concern:*

Be it known that I, CARL E. AKELEY, a citizen of the United States, residing at New York, borough of Manhattan, city of greater New York, and State of New York, have invented certain new and useful Improvements in Film-Guides for Motion-Picture Cameras, of which the following is a specification.

My invention relates to motion picture cameras of that type disclosed in an application for Letters Patent, filed by me April 27, 1916, Serial No. 93,929, of which the present application is a division.

The object of the present invention is to provide means for causing the film in its passage past the point of exposure to be bowed slightly to the rear, whereby the gelatinized front surface of the film will be kept out of contact with the film guide.

In the accompanying drawing:—

Figure 1 is a rear elevation of my improved film guide detached from the camera casing.

Fig. 2 is a vertical transverse sectional view taken on the line II—II of Fig. 1.

Fig. 3 is a view similar to Fig. 2, taken on the line III—III of Fig. 1.

Fig. 4 is a transverse sectional view taken on the line IV—IV of Fig. 2.

Similar numerals of reference denote corresponding parts in the several views.

In the said drawing, the reference numeral 1 denotes a film guide adapted to be fastened detachably in the casing of a camera of the type disclosed in my application for Letters Patent hereinbefore referred to, said film guide being disposed back of the lens of said casing. Said film guide comprises side plates 2 curved along their front edges to conform to the contour of the interior of the camera casing, and a back plate 3, which is apertured centrally to permit the taking of pictures, it being understood that the film passes downwardly along the rear surface of said back plate 3.

Hinged at 4 to the film guide formed by the side plates 2 and back plate 3 is a film guide gate 5, between which and the back plate 3 the film passes, said gate being apertured at 6 to register with the exposure aperture in the back plate 3, and being retained in its closed position by a spring latch 7 fixed to one of the side plates 2, as shown. Loosely mounted in the back plate 3 on each side of the exposure aperture therein are vertically disposed presser plates 8, the same being retained yieldably in position by means of springs 9 fixed to the side plates 2, and being so disposed as to register with the perforated edges of the film. Also mounted above and below the exposure aperture in the back plate 3, in horizontal slots therein, are anti-friction rollers 10, the same being spring pressed to operative position by means of springs 11, in a manner readily understood. The vertical edges of the film guide gate 5 along their inner surfaces are curved slightly at 12, as best seen in Fig. 4, and the presser plates 8 are similarly curved, the result being that the vertical edges of the film 13 passing therebetween are correspondingly curved, which causes a rearward projection of the body of the film that maintains its ungelatinized back face in contact with the guide-gate 5, and its gelatinized front face away from the back plate 3, thereby preventing accidental scratching of said front face. And in the event that there is any slight contact of the front face of the film, this is received upon the anti-friction rollers 10 and the scratching minimized.

While I have shown and described my improved device as applied to a camera of the type described in my application hereinbefore referred to, it is obvious that my improved mechanism may be applied to cameras of different constructions.

Having thus described my invention, what I claim as new and desire to secure by Letters Patent, is:—

1. In a motion picture camera, the combination with the film and on opposite sides of the field of exposure, of guides between which the edges of the film pass, said guides forming curved paths to impart a corresponding curvature to the edges only of the film while causing the intermediate portions to be projected in a plane away from the lens.

2. In a motion picture camera, the combination with the film and on opposite sides of the field of exposure, of guides between which the edges of the film pass, said guides forming curved paths which impart a corresponding curvature to the edges only of the film while projecting the intermediate portion in a plane away from the lens, anti-friction rollers disposed in front of the film and adapted to receive any contact on that side from the film, and springs for maintaining said rollers in position.

3. In a motion picture camera, a film guide, resiliently mounted presser plates therein adapted to engage the edges of the film, the engaging faces of said plates being convexed, a guide gate disposed in the rear of said film guide and having faces curved correspondingly to the curvature of said presser plates, whereby the edges of the film only will be correspondingly curved and the body thereof projected rearward in a plane, anti-friction rollers disposed in front of said film and adapted to receive any contact therefrom on that side, and springs for maintaining said rollers resiliently in position.

In testimony whereof I hereunto set my hand this 12th day of September, 1916.

CARL E. AKELEY.